United States Patent [19]

Mitsuyasu et al.

[11] Patent Number: 5,463,506
[45] Date of Patent: Oct. 31, 1995

[54] HEAD DRUM APPARATUS

[75] Inventors: Tamotsu Mitsuyasu, Kamakura; Takuji Sekiguchi, Machida, both of Japan

[73] Assignee: Nippon Hoso Kyokai, Tokyo, Japan

[21] Appl. No.: 155,800

[22] Filed: Nov. 23, 1993

[30] Foreign Application Priority Data

Nov. 25, 1992 [JP] Japan .................................. 4-315194
Feb. 8, 1993 [JP] Japan .................................. 5-020090

[51] Int. Cl.$^6$ ........................................ G11B 21/02
[52] U.S. Cl. ............................... 360/77.17; 360/77.16; 360/75; 360/107
[58] Field of Search ............................... 360/71, 69, 137, 360/74.3, 107, 77.16, 77.17, 75

[56] References Cited

U.S. PATENT DOCUMENTS 5,319,506  6/1994  Kojima et al. .................... 360/73.05

FOREIGN PATENT DOCUMENTS

| | | |
|---|---|---|
| 0100284 | 2/1984 | European Pat. Off. . |
| 0292008 | 11/1988 | European Pat. Off. . |
| 54-72029 | 6/1979 | Japan . |
| 54-72028 | 6/1979 | Japan . |
| 55-157123 | 12/1980 | Japan . |
| 56-114151 | 8/1981 | Japan . |
| 59-019227 | 1/1984 | Japan . |
| 59-180822 | 10/1984 | Japan . |
| 60-45926 | 3/1985 | Japan . |
| 63-291250 | 11/1988 | Japan . |
| 63-291249 | 11/1988 | Japan . |
| 63-291248 | 11/1988 | Japan . |
| 1-137424 | 5/1989 | Japan . |

*Primary Examiner*—Aristotelis Psitos
*Assistant Examiner*—Varsha A. Kapadia
*Attorney, Agent, or Firm*—Antonelli, Terry, Stout & Kraus

[57] ABSTRACT

A head drum apparatus includes a cylindrical piezoelectric ceramic member formed of a polarized ceramic material and having inner and outer peripheral surfaces. A plurality of electrodes are formed on at least one of the inner and outer peripheral surfaces of the piezoelectric ceramic member. The piezoelectric ceramic member vibrates in response to an AC voltage applied to the electrodes. A cylindrical stationary head drum having an inner peripheral surface and an outer peripheral surface around a portion of which a magnetic tape is wound is caused to vibrate in a bending mode under vibration of the piezoelectric ceramic member. The stationary head drum includes a cylindrical stationary portion, a cylindrical vibratory portion and a cylindrical thin wall portion provided between the stationary portion and the vibratory portion. The piezoelectric ceramic member is coupled to the vibratory portion so that the vibratory portion is caused to vibrate under vibration of the piezoelectric ceramic member. Tape data indicative of types of the tapes is read out for driving the piezoelectric ceramic member by the AC voltage having a frequency and an amplitude determined on the basis of the tape data.

19 Claims, 11 Drawing Sheets

HEAD DRUM APPARATUS

BACKGROUND OF THE INVENTION

1. Field of the Invention

The present invention generally relates to a head drum apparatus employed in recording/reproduction apparatuses such as a video tape recorder (VTR) and a digital audio tape recorder (DAT). More particularly, the invention is concerned with a technique for reducing a friction between a magnetic tape and the head drum to thereby ensure a satisfactory contact between the tape and the drum.

2. Description of the Related Art

In recent years, a magnetic tape on which data or information can be recorded with a high density by using short wavelength signals has been developed and used in practical applications such as the VTR, DAT and others. When compared with the conventional tape, the tape intended for the applications mentioned above features an extremely thin magnetic layer and a very smooth surface, which are favorable for realizing a high noise-reduction capability. However, the tape is likely to adhere or stick to the drum surface because of the features mentioned above, as a result of which friction between the tape and the drum increases to such extent that adverse influence is exerted to the transportation of the tape. This phenomenon is remarkable when dew condensation takes place on the drum surface and therefore good contact of the head with the tape is required.

The head drum of an upper drum rotation type is now being replaced by an intermediate drum rotation type or an intermediate disk rotation type drum structure. However, in the case of the drum structure of the intermediate drum or disk rotation type, the area occupied by a fixed or stationary drum part increases, which results in an increase in the friction between the tape and the stationary drum part, unfavorable for the tape transportation. In particular, when dew condensation occurs on the drum surface, transportation of the tape tends to become more difficult.

Figure 14:
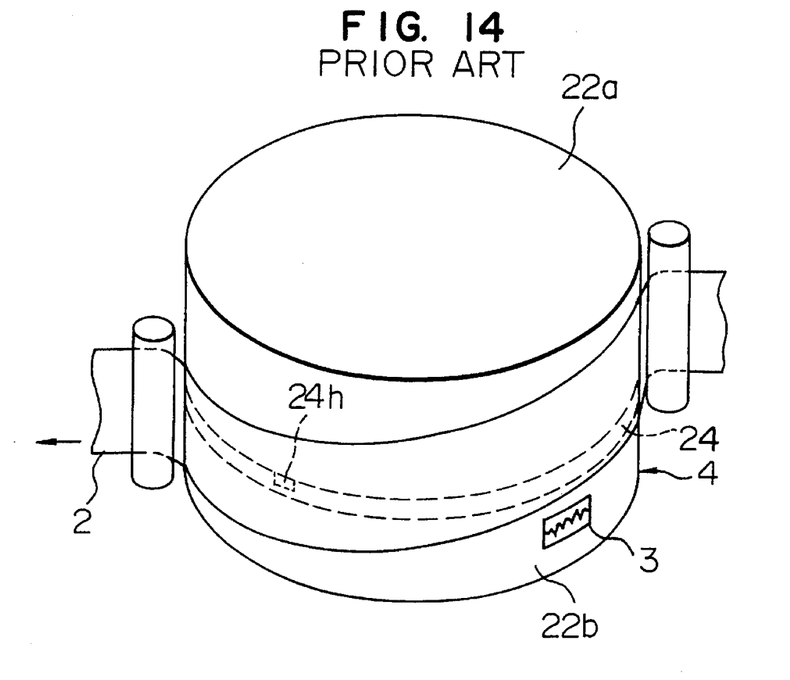
FIG. 14 is a perspective view showing a head drum apparatus known heretofore.
Figure 15:
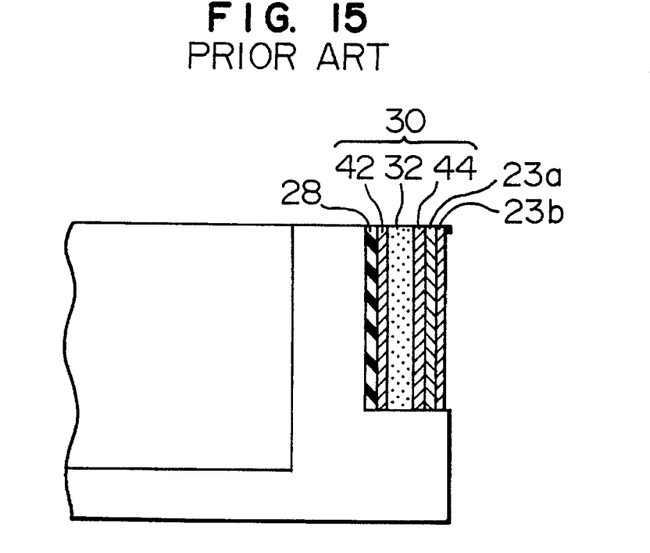
FIG. 15 is a crosssection showing a piezoelectric ceramic member used in the known apparatus shown in FIG. 14.

As one of the methods for solving the problems mentioned above, it is conceivable to roughen the surface of the magnetic tape. In that case, however, another problem arises that the contact between the tape and the head is degraded. Under the circumstances, there is proposed in JP-A-54-72028 and JP-A-54-72029 a head drum structure in which a means for vibrating the magnetic tape is provided as a very small constituent part of the drum, as an attempt to solve the problems mentioned above, as shown in FIG. 14. Referring to FIG. 14, the head drum assembly 4 is comprised of stationary drum parts 22a and 22b and an intermediate disk 24 provided with a magnetic head 24h, and a dew condensation detecting device 3 is provided in a part of the outer peripheral surface of the drum 22b. A piezoelectric ceramic member is used to cause the tape to vibrate. As shown in FIG. 15, the ceramic member is disposed on a part of the outer peripheral surface of the stationary drum 22b in JP-A-54-72028 and has conductive layers formed of silver paste on the inner and outer surfaces thereof. Two metal layer are formed on the conductive layer of the tape contacting surface by metal plating. When dew condensation is detected by a dew detecting device 3, a high-frequency voltage is applied to the piezoelectric ceramic member, as a result of which the drum is caused to vibrate with a very small amplitude to thereby prevent the magnetic tape from sticking to the drum surface. According to the teachings disclosed in JP-A-54-72028, the piezoelectric ceramic member itself constitutes a part of the stationary drum. However, as a matter of practice, it is not easy to realize the mechanical precision requirement involved in forming the piezoelectric ceramic member so that the high-density recording can be ensured. Further, a method of manufacturing the head drum apparatus of the structure mentioned above will be much complicated and incur degradation in the yield.

In JP-A-54-72029 a piezoelectric ceramic member is employed of a bimorph structure which makes it possible to increase the amplitude of vibration.

Figure 16:
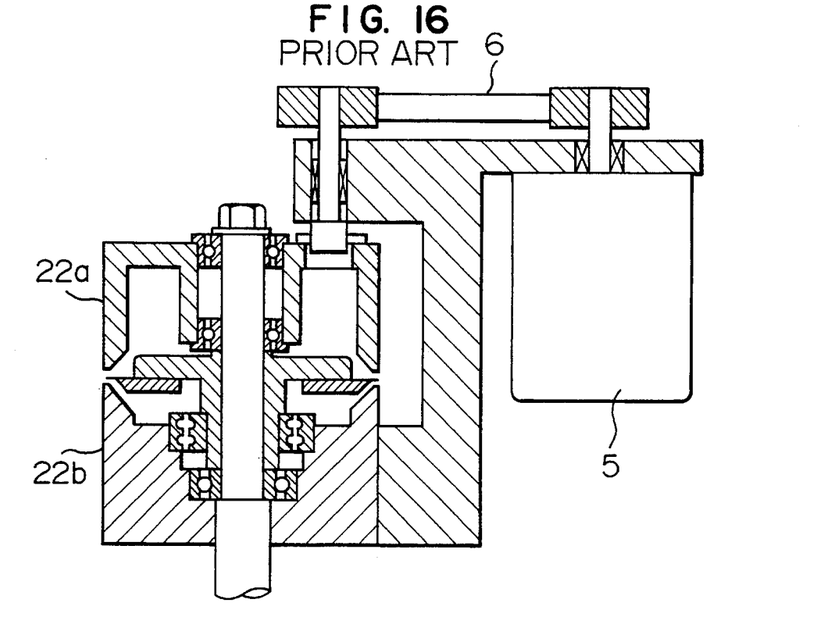
FIG. 16 is a sectional view showing a structure of a head drum apparatus known heretofore in which a motor is employed as a vibration generating device.

In JP-A-56-114151, there is disclosed a drum structure in which an electric motor is employed as a high-frequency vibration generating device, as shown in FIG. 16 of the accompanying drawings. Referring to the figure, the head drum apparatus of the intermediate disk rotation type includes upper and lower drums 22a and 22b which are caused to vibrate in the rotational direction of the drums under vibration applied by a motor 5 via a connecting rod 6, whereby sticking of a magnetic tape to the drum surface is prevented. Parenthetically, a tape tension control is realized by making variable the position of a tape guide post with the aid of a mechanical spring. As the alternative, a method of controlling a reel motor in dependence on the position of the post as detected by using a Hall element may be adopted for the tape tension control. A problem of this known vibration generating mechanism is seen in that the vibration of a high frequency cannot be generated, whereby adverse influence is exerted to the quality of picture or audio signal as reproduced.

Furthermore, there are disclosed in JP-A-63291248, JP-A-63-291249 and JP-A-63-291250 techniques for transporting the magnetic tape under the effect of a traveling wave in the direction longitudinal or transversal of the tape transportation by applying a high-frequency voltage signal to a number of piezoelectric ceramic members provided groupwise. However, these known techniques also suffer a problem in respect to the tape tension control in that the position of the post varies due to change in the tension, as a result of which configuration of the tape transportation system is changed to affect adversely the tape running speed and hence the quality of picture as reproduced.

SUMMARY OF THE INVENTION

In the light of the state of the art described above, it is an object of the present invention to provide a head drum apparatus for recording/reproducing apparatuses such as VTR and DAT, which head drum apparatus can sufficiently reduce or mitigate friction between a magnetic tape and a drum head.

It is another object of the invention to provide a head drum apparatus which is capable of generating a small standing wave vibration on a surface of a head drum.

Yet another object of the invention is to provide a head drum apparatus in which a standing wave vibration can be generated on a drum surface of a head drum whenever vibration thereof is required as in the case of occurrence of dew condensation on the drum surface.

Further, it is an object of the present invention to provide a head drum apparatus in which vibration of a piezoelectric ceramic member can be transmitted to a drum surface of a head drum with attenuation of the vibration being suppressed to a minimum.

It is a further object of the invention to provide a head drum apparatus in which amplitude and/or frequency of vibration generated by a piezoelectric ceramic member can be controlled in dependence on types of magnetic tapes as used.

A still further object of the invention is to provide a head drum apparatus which is capable of controlling the vibration of a piezoelectric ceramic member in dependence on tension applied to the magnetic tape.

Yet another object of the invention is to provide a head drum apparatus in which vibration frequency of a piezoelectric ceramic member can be controlled by detecting acceleration of the vibration applied to a head drum.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, a head drum apparatus according to the present invention will be described in detail with reference to the accompanying drawings.

Figure 1:
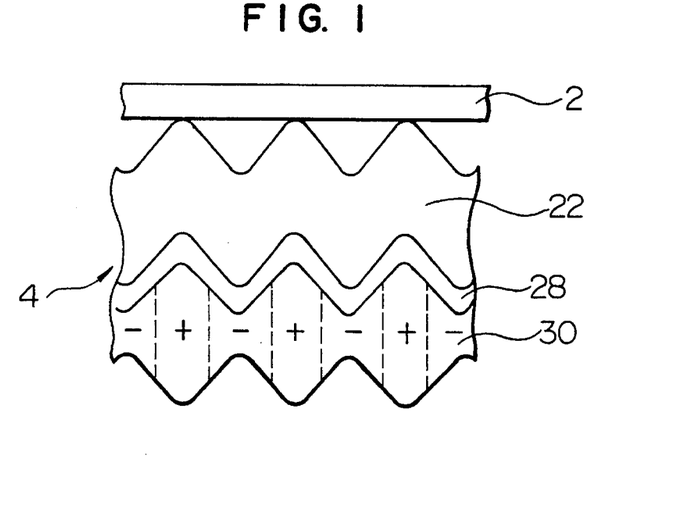
FIG. 1 is a schematic diagram for illustrating the underlying principle for reducing friction between a magnetic tape and a head drum in a head drum apparatus according to the present invention.

FIG. 1 shows the principle of the head drum apparatus according to the present invention in which friction between a tape and a head drum can be reduced. A DC voltage as a polarization voltage is applied to a cylindrical piezoelectric ceramic member 30 with an electrode pattern formed thereon such that the inner surface electrode of the ceramic member 30 is connected to, for example, ground and the outer surface electrodes are alternatively connected to "+" and "−" polarities of the DC voltage with respect to the ground, so that the ceramic member 30 is polarized to give the crystal thereof directionality. The polarization is made by applying a high DC voltage of about 2000 V/mm to lead zirconate titanate, for example. Thereafter, when a DC voltage is applied to the ceramic member 30 such that the inner surface electrode is connected to the ground and all the outer surface electrodes are connected to "+" polarity of the DC voltage, a portion of the ceramic member 30 expands to which there is applied the DC voltage of the same "+" polarity as that of the polarization voltage and a portion thereof contracts to which there is applied the DC voltage of the different "−" polarity from that of the polarization voltage. Similarly, if all the outer surface electrodes are connected to "−" polarity of a DC voltage, a portion of the ceramic member 30 contracts which is polarized with the DC voltage of "+" polarity and another portion thereof expands which is polarized with the DC voltage of "−" polarity. Thus, when an AC voltage is applied to the outer surface electrodes, a vibrating wave appears on the ceramic member 30. The vibration is transferred to a drum 22 through adhesive agent 28 so that vibration having small amplitude appears on the drum surface. Consequently, the contact area between the tape 2 and the outer surface of the drum 22 is reduced such that the tape floats on the drum apparently, resulting in reducing the friction between the tape and the drum.

Figure 2:
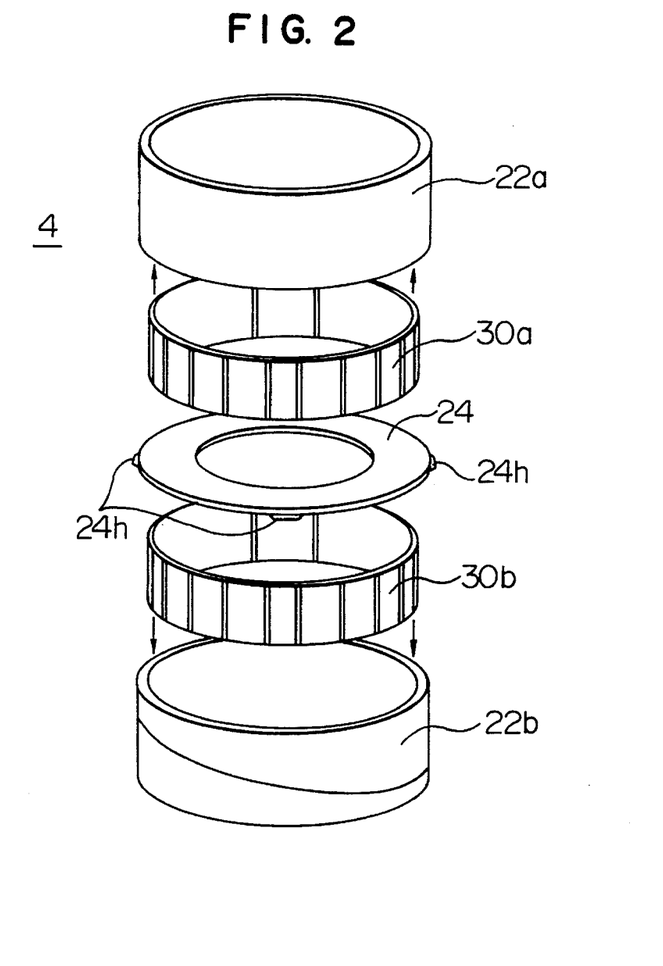
FIG. 2 is an exploded view for illustrating a structure as well as assembling of a head drum apparatus of an intermediate disk rotation type according to an embodiment of the invention.

Next, the drum structure of the head drum apparatus according to the present invention will be described in detail. Referring to FIG. 2, a head drum structure of an intermediate disk rotary type will be first described to which the present invention is applied.

Piezoelectric ceramic members 30a and 30b are polarized in advance such that "+" and "−" polarities appear on the outer surfaces thereof. As a polarization pattern various patterns are allowed but the detail will be described later.

An upper drum 22a and a lower drum 22b are both metal stationary or fixed drums. The piezoelectric ceramic members 30a and 30b are coupled to the inner surfaces of the upper and lower drums 22a and 22b with adhesive agent 28 of, for example, epoxy resin which hardens at the room temperature, respectively. Then, the upper and lower drums 22a and 22b are coupled such that an intermediate disk 24 having a plurality of head chips 24h is sandwiched therebetween. Thus, the head drum 4 is completed.

Figure 3A:
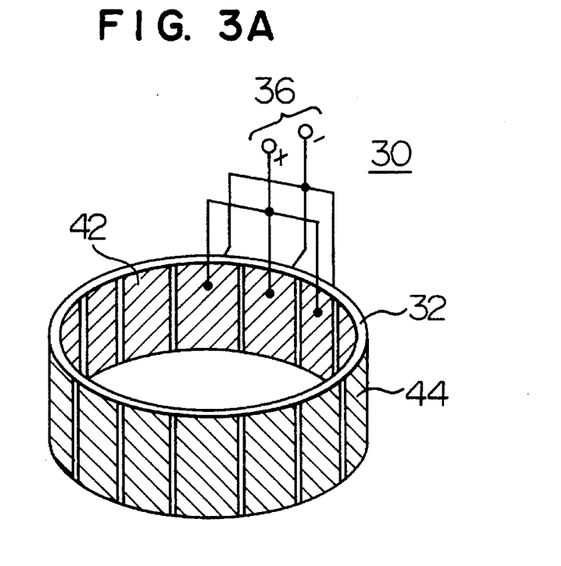
FIG. 3A is a schematic perspective view of a cylindrical piezoelectric member used in a head drum apparatus according to an embodiment of the invention and illustrates, by way of example, a electrode pattern of the polarized ceramic member and electrical connections therefor.
Figure 3B:
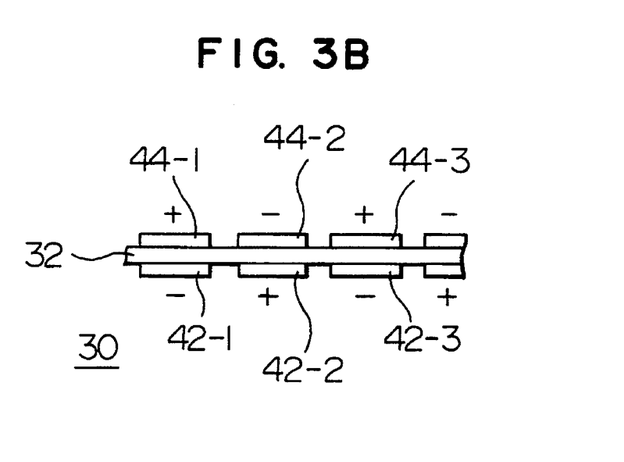
FIG. 3B is a diagram for schematically illustrating polarities of voltages applied to electrodes of the piezoelectric ceramic member shown in FIG. 3A.

Next, referring to FIGS. 3A to 5, examples of an electrode pattern and a method of applying a high frequency voltage will be described. As shown in FIG. 3A, a plurality of electrically conductive electrodes 42 and 44 are formed on the inner and outer surfaces of a cylindrical piezoelectric ceramic plate 32 to construct the piezoelectric ceramic member 30. Each of the inner surface electrodes 42 is formed such that it overlaps the corresponding outer surface electrode 44 through the ceramic plate 32. The number of electrodes on the inner or outer surface is determined to be equal to twice as many as that of peaks of vibration to be generated. As shown in FIG. 3B, each electrode is applied with a high voltage having a polarity opposite to that of the high voltage which is applied to an adjacent electrode so as to perform polarization. After the polarization the electrodes on the inner and outer surfaces are collectively integrated to form two integrated electrodes, respectively. As a method of integrating the electrodes, in addition to a method of connecting the electrodes one after another by conductive wires, there are possible a method of fixing the ceramic member 30 to the drum connected to ground by conductive adhesive agent and another method of making one large inner electrode at the time of polarization which electrode is thereafter divided into a plurality of inner surface electrodes. The conductive adhesive agent is epoxy resin adhesive agent of silver paste for example.

When a voltage is applied between the integrated electrodes, a portion of the piezoelectric ceramic member expands to which the voltage with the same polarity as that of the polarization voltage is applied and another portion thereof contracts to which the voltage with the polarity opposite to that of the polarization voltage is applied. In this manner, the electrode portions of the piezoelectric ceramic member expands or contracts. Therefore, if an AC voltage is applied, the piezoelectric ceramic member performs bending vibration. The wavelength of the bending vibration is determined based on the electrode pattern in the polarization. The vibration of the piezoelectric ceramic member is transferred to the stationary or fixed drum as flexural wave so that standing wave vibration appears on the outer surface of the drum. The frequency of the AC voltage to be applied will be described later.

As seen from the above description, when the tape is wound on the drum as shown in FIG. 1, the contact area between the tape and the drum is apparently reduced so that the friction between the tape and the drum can be eliminated. Further, since the resonance frequency of a drum structure and the wavelength of standing wave can be determined from the number of arranged electrodes, freedom in design can be enhanced. It should be noted that the drum is subjected to a special work processing as described later because the amplitude of vibration on the outer surface of the drum is very small.

Figure 4:
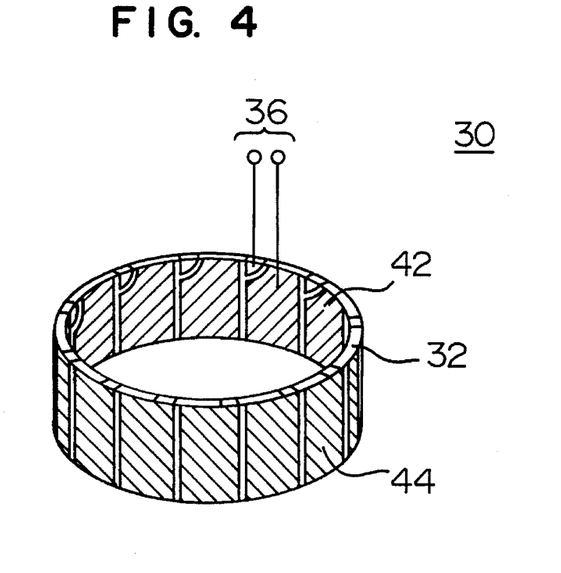
FIG. 4 is a perspective view of another electrode pattern in a cylindrical piezoelectric ceramic member according to another embodiment of the invention.

FIG. 4 shows an example in which the outer surface electrode is extended to the inner surface to make it possible to connect the electrodes to each other so that assembling of the piezoelectric ceramic member 30 into the drum 22 can be facilitated. Even in this case, the operation is the same as in FIG. 3A.

Figure 5A:
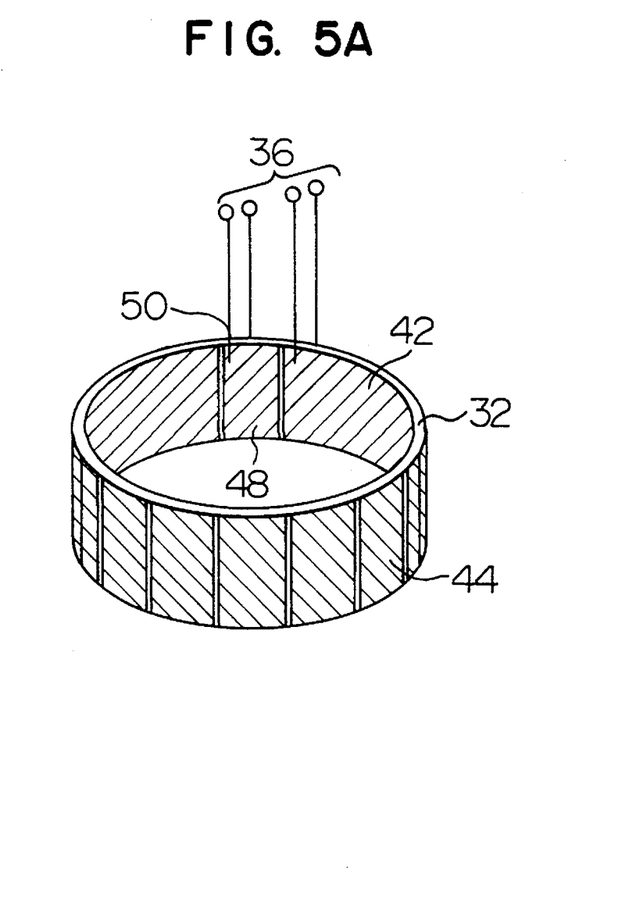
FIG. 5A is a perspective view showing further another electrode pattern of a cylindrical piezoelectric ceramic member which can also be employed for detecting acceleration according to yet another embodiment of the invention.
Figure 5B:
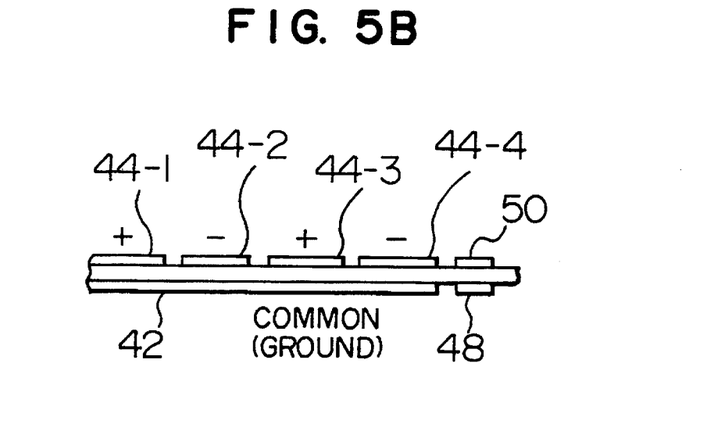
FIG. 5B is a diagram for illustrating schematically polarities of voltages applied to the polarized cylindrical piezoelectric ceramic member shown in FIG. 5A.

FIG. 5A shows an example of an electrode pattern on the piezoelectric ceramic member in which the standing wave having the desired number of waves can be generated as well as the manufacturing and driving can be facilitated. As shown in FIG. 5B, this electrode pattern has electrodes 44 and 50 of the same number as that in FIG. 3A disposed on the outer surface. There are disposed on the inner surface a small electrode 48 corresponding to one of the outer surface electrodes and a large common electrode 42 corresponding to the remaining outer surface electrodes. The common electrode 42 is connected to ground and the outer surface electrodes are alternatively connected to positive and negative voltages in a circumferential direction with respect to the ground to polarize a cylindrical ceramic plate of the ceramic member. At this time the small inner surface electrode is connected to the positive or negative voltage. In driving the ceramic member 30, the small inner surface electrode is connected to ground and the common electrode 42 is applied with a voltage. Even if adhesion between the piezoelectric ceramic member and the drum is made by conductive or nonconductive adhesive agent no change occurs in the effect. As a result, a portion of the ceramic member having the same relation between the polarization and the driving in the polarity expands and another portion thereof having the opposite relation contracts. In this manner, since the electrode portions of the piezoelectric ceramic member expand or contract, the piezoelectric ceramic member make bending vibration when the AC voltage is applied. In the above embodiment the small inner surface electrode 48 is connected to the ground and the common electrode 42 is applied with a voltage. However, it should be noted that the connections may be opposite.

Figure 6:
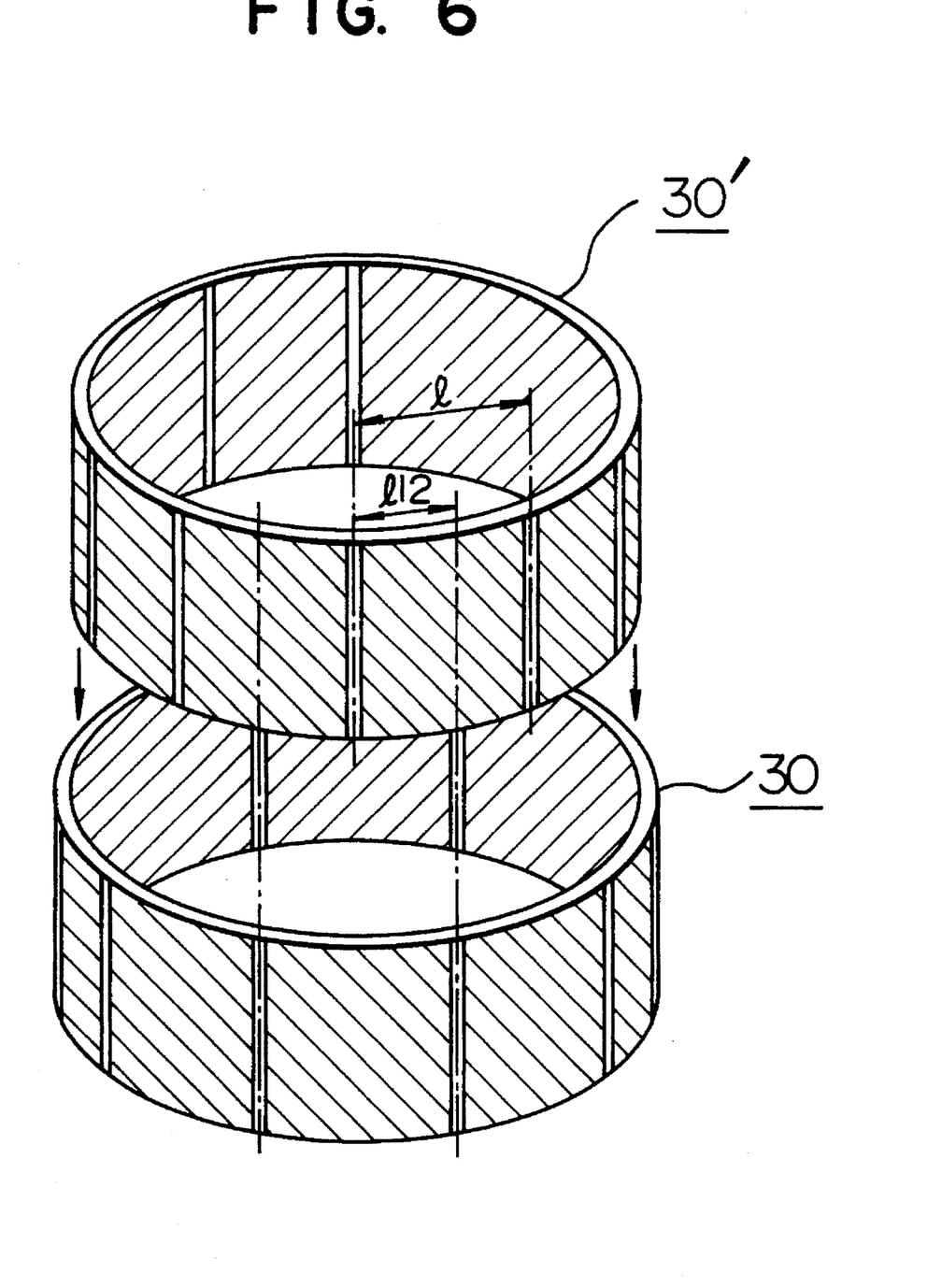
FIG. 6 is an exploded perspective view showing a pair of cylindrical piezoelectric ceramic members employed in a head drum apparatus according to still another embodiment of the invention.

In the above embodiment, one cylindrical piezoelectric ceramic member 30 is adhered to one drum. However, a piezoelectric ceramic member may be further adhered to the inside of the adhered ceramic member. This example is shown in FIG. 6. An inner piezoelectric ceramic member 30' has the same electrode patter as that of the outer piezoelectric ceramic member and is adhered to the outer piezoelectric ceramic member such that each electrode of the inner ceramic member is shifted in a circumferential direction by a half of the electrode width from a corresponding electrode of the outer ceramic member. In this embodiment, the adhered ceramic members may have different electrode patterns from each other and two or more ceramic members may be adhered to one after another.

Next, the drum structure to which the piezoelectric ceramic member is adhered will be described below.

Figure 8:
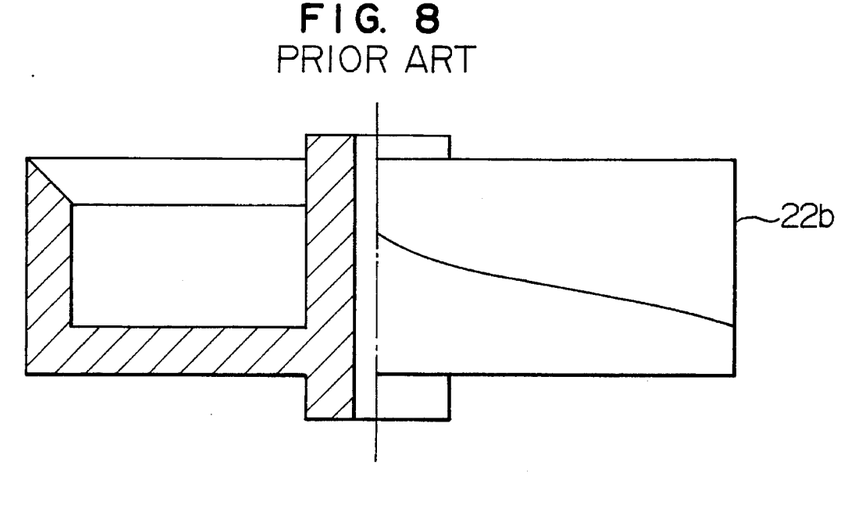
FIG. 8 is a partially sectioned side elevational view showing a structure of a stationary drum known heretofore.

FIG. 8 shows a structure of a lower stationary drum 22 known therefore. It should be noted that the following description can be applied to an upper stationary drum. A vibrating portion of the lower stationary drum is fixedly secured to a stationary portion. Consequently, the vibration energy from the piezoelectric ceramic member attenuates remarkably before reaching the outer surface of the drum.

Thus, it is impossible to obtain the vibration of a desired amplitude, making it difficult to attain a friction eliminating effect in a satisfactory manner.

Figure 7A:
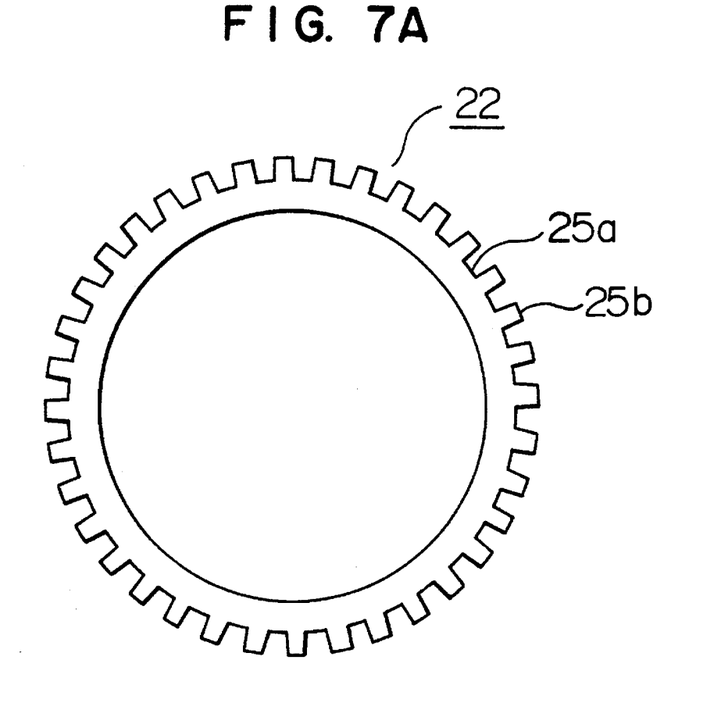
FIG. 7A is a top plan view showing a drum formed with a plurality of fine recesses and employed in a head drum apparatus according to a further embodiment of the invention.
Figure 7B:
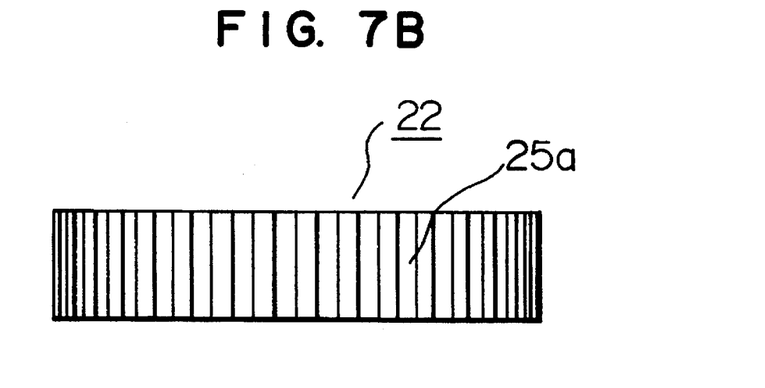
FIG. 7B is a side elevational view of the same.

FIGS. 7A and 7B show a structure of a drum 22a or 22b formed with a plurality of fine recesses 24 or protrusions 25 in the outer surface. In the case the vibration generated by the ceramic member mounted internally is amplified by the protrusions formed on the outer surface of the drum. More specifically, because the thickness of the drum increases in appearance (i.e., because the volume of the drum decreases by the serration, to say in another way), the amplitude of vibration on the drum outer surface can increase to such extent that the tape is brought into contact with the drum only at apexes of the vibration wave, whereby friction between the tape and the drum can further be reduced.

Figure 9:
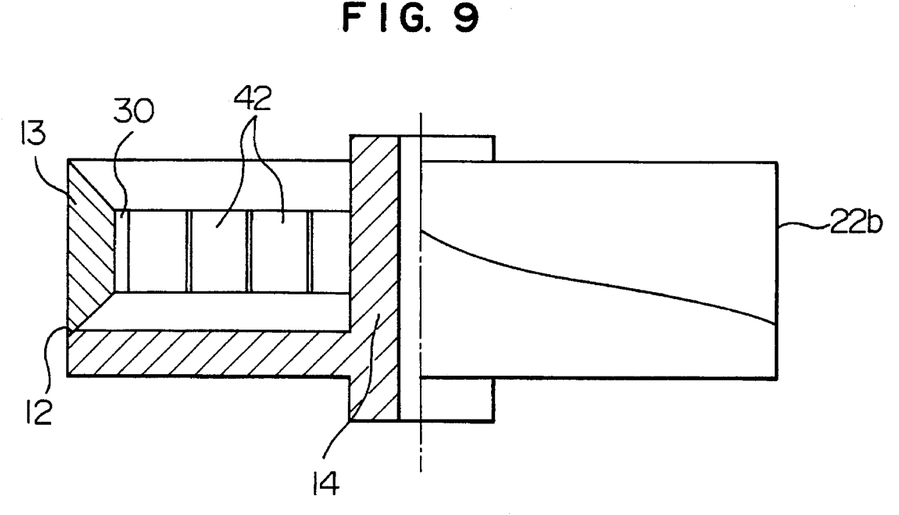
FIG. 9 is a view similar to FIG. 8 and shows a stationary drum structure according to an embodiment of the invention.

In a drum structure of the present invention shown in FIG. 9, the vibration transferred from the piezoelectric ceramic member can be prevented from being attenuated. In the drum structure shown in FIG. 9 of the intermediate drum or disk rotation type, a vibrating portion 13 of a lower stationary drum 22b having a piezoelectric ceramic member bonded thereto is provided with a thin wall portion 12 formed by removing therefrom a portion contacting with a stationary portion of the drum 22b. Machining for forming the thin wall portion 12 is performed along the whole inner surface of the vibrating portion 13. The machining should be so performed that any trace thereof does not appear on the outer surface of the drum in order to avoid adverse influence to the transportation of the tape. It should be further mentioned that there is no necessity of changing the height of the drum. Since the vibrating portion 13 and the stationary portion 14 are separated from each other with regard to the vibration, attenuation in the vibration energy generated by the ceramic member 30 can be minimized. More specifically, unless the thin wall portion 12 is formed, the stationary drum represents a rigid body as a whole, and a change in geometrical structure at a portion of the stationary drum will exert a significant influence to the resonance frequency. In contrast, in the case where the vibrating portion 13 is separated from the stationary portion 14, the estimated resonance frequency of the vibrating portion 13 calculated based on only the geometrical factors of the vibrating portion 13 will scarcely differ from an actual resonance frequency. Therefore, since the analyzed value and the actual value of resonance frequency coincide well in determining the vibration frequency and driving voltage for the vibration generating element such as the piezoelectric ceramic member, there is the merit that a control circuit is easily designed and manufactured. In this embodiment, the piezoelectric ceramic member is provided at the inside of the drum. However, even if other types of vibration generating element are attached to the outer surface of the drum, there is also the effect that the attenuation of vibration can be prevented.

Figure 10:
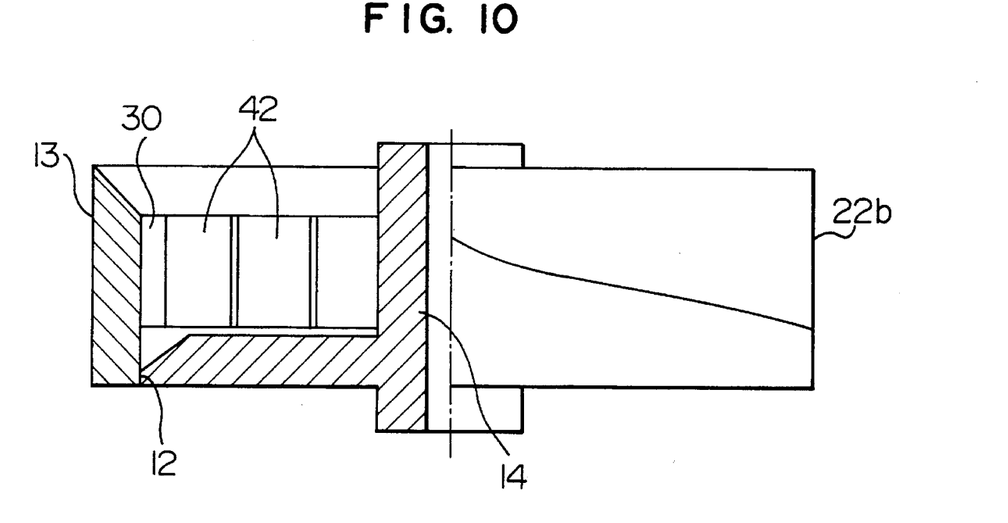
FIG. 10 is a view similar to FIG. 9 and shows a modification of a stationary drum structure according to the invention.

FIG. 10 shows a modification of the drum structure. In the case of the drum structure shown in FIG. 9, the thin wall portion 12 is formed in the vibrating portion 13. In contrast, in this case a thin wall portion 12 is formed in the stationary portion 14 at a circumferential portion thereof contacting with the vibrating portion 13. According to the drum structure shown in FIG. 10, the attenuation of the vibration can effectively be prevented without changing the height of the drum.

Figure 11:
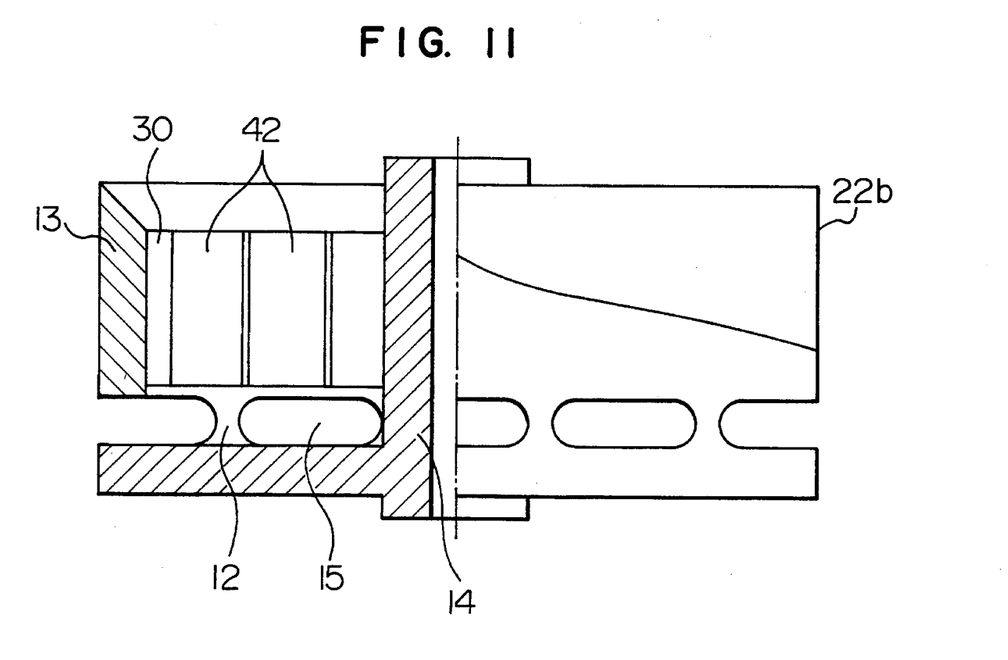
FIG. 11 is a view similar to FIG. 9 and shows another modification of a stationary drum structure according to the invention.

FIG. 11 shows another modification of the drum structure. In the case of this modification, a plurality of elongated circular bores are formed in a coupling portion between a vibrating portion 13 and a stationary portion 14 the attenuation of vibration energy to the vibrating portion 13 is further minimized.

Figure 12:
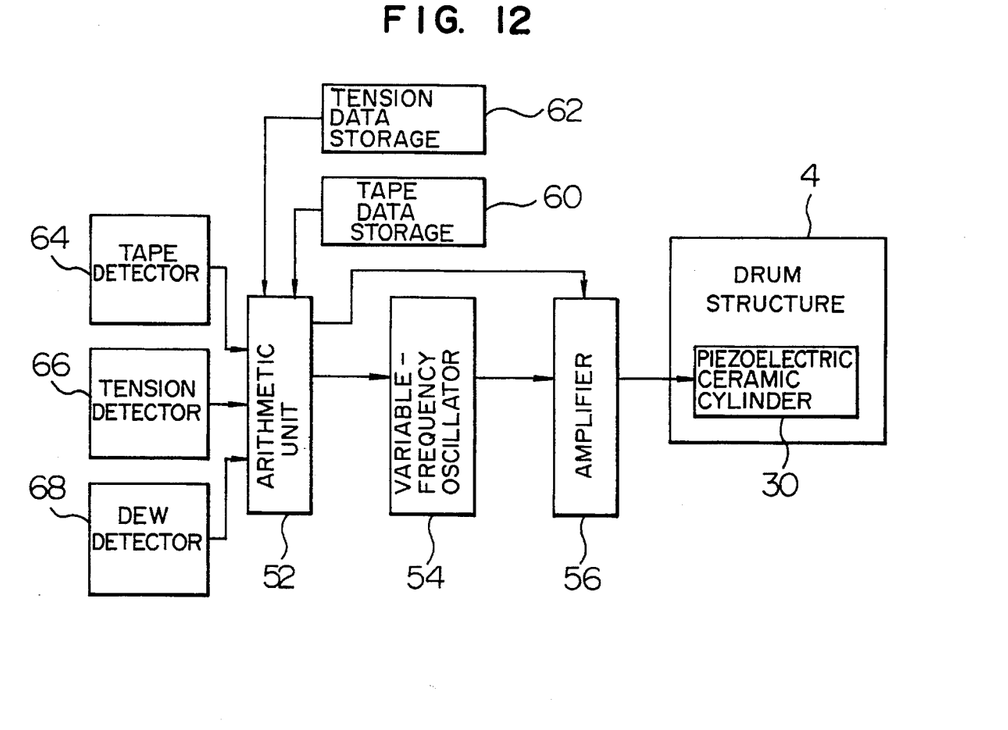
FIG. 12 is a block diagram showing a driving circuit employed in a head drum apparatus according to an embodiment of the invention.

FIG. 12 shows a driving circuit from the piezoelectric ceramic member 30 of the head drum apparatus according to the present invention, which circuit is designed to impart small vibration to the head drum structure 4. In FIG. 12 the drive circuit includes a memory 60 for storing data indicative of frequencies and amplitudes of the high frequency voltages applied to the piezoelectric ceramic member in dependence on the types of tapes to be used. A memory 62 stores data concerning permissible tensions to be applied in a tape transportation or traveling system. A tape detector 64 detects the type of tape to be used from information presented by a case housing the tape and informs the detected type of the tape to an arithmetic unit 52. A tension detector 66 detects the tension of the tape being transported and outputs the detected result to the arithmetic unit 52. A dew detector 68 detects dew condensation and the detected result is also output to the arithmetic unit 52.

In the case of the drum structure 4 now under consideration, it is assumed that the piezoelectric ceramic member 30 has the electrode pattern shown in FIG. 3A. The arithmetic unit 52 starts control of vibration in response to reception of a dew detection signal supplied from the dew detector 68. Of course, start of the vibration control operation of the arithmetic unit 52 may be commanded from other input unit (not shown). The arithmetic unit 52 identifies the type of the tape as used on the basis of the output from the tape detector 64 and determines an optimal vibration amplitude and an optimal vibration frequency by referencing to the tape data 60 in accordance with the type of the tape being used as a parameter, to generate a frequency control signal and an amplitude control signal which are supplied to a variable-frequency oscillation circuit 54 and an amplifier 56. The variable-frequency oscillation circuit 54 generates a high-frequency voltage signal of a frequency determined on the basis of the frequency control signal. The high-frequency voltage signal is then supplied to the amplifier 56 which amplifies the high-frequency signal in response to the amplitude control signal supplied from the arithmetic unit 52. The high-frequency voltage signal thus amplified is applied to the piezoelectric ceramic member 30 which is then vibrated to prevent the tape from sticking to the head drum structure.

Figure 13:
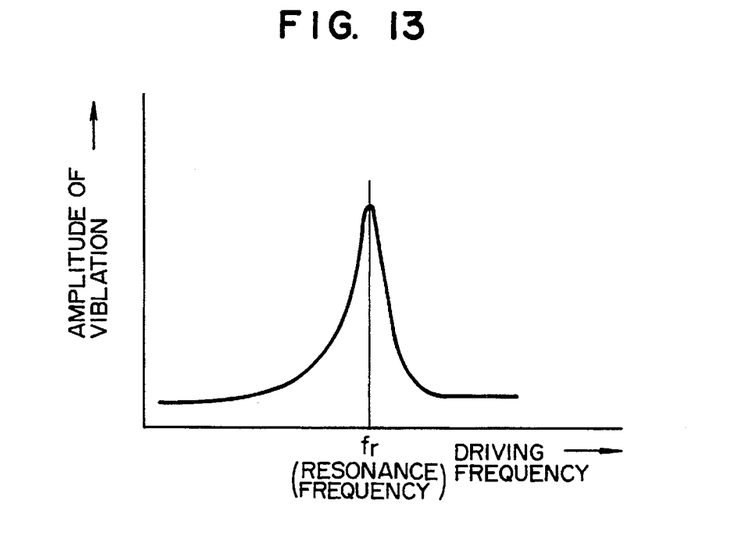
FIG. 13 is a view for illustrating graphically a relation between amplitude and frequency of vibration generated on an outer peripheral surface of a stationary drum.

Further, the arithmetic unit 52 reads out the tension data from the memory 62 in response to the dew detection signal and holds the data therein. In the course of tape transportation, a tape tension signal supplied from the tension detector 66 is compared with the tension value as held, whereby the amplitude control signal is generated on the basis of the result of comparison and supplied to the amplifier 56 to thereby hold the tension substantially constant without changing the position of a tension control post. In order to increase or decrease the vibration amplitude, it is sufficient to increase or decrease the voltage applied to the ceramic member or to shift the driving frequency of the high-frequency voltage by a little bit. The driving frequency of the piezoelectric ceramic material 32 and the vibration amplitude of the drum surface bear in such a relationship to each other as illustrated in FIG. 13. As can be seen from this figure, when the driving frequency shifts from the resonance frequency $f_r$, the vibration amplitude decreases abruptly. For this reason, it is desirable to monitor constantly the resonance frequency of the piezoelectric ceramic member and feed back the value of the resonance frequency to the arithmetic unit 52.

Figure 17:
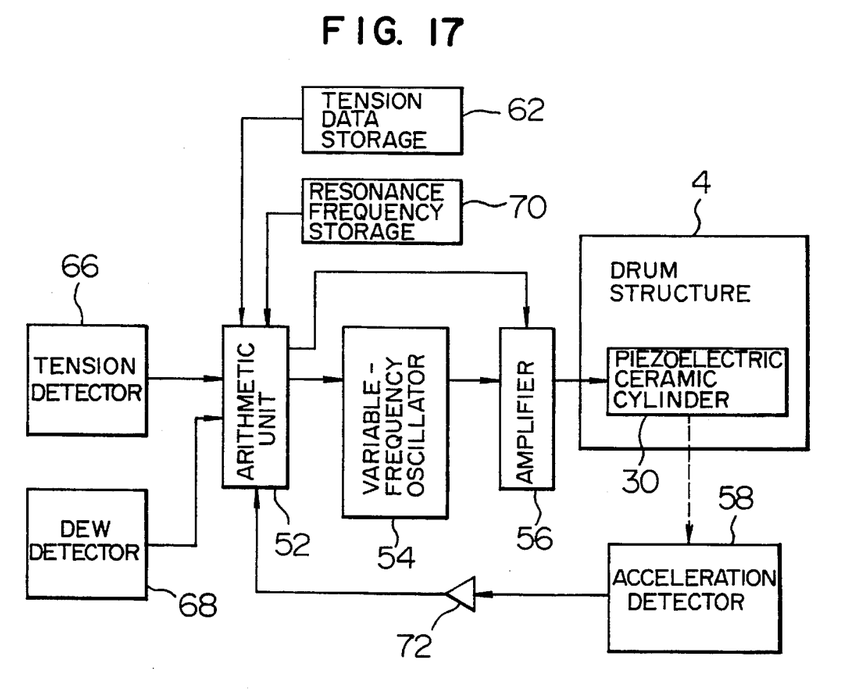
FIG. 17 is a block diagram showing a configuration of a driving circuit for a head drum apparatus according to an embodiment of the invention.

FIG. 17 shows an exemplary circuit configuration to this end. In this figure, the circuit components same as or equivalent to those shown in FIG. 12 are designated by like reference characters and repeated description thereof is omitted. Referring to FIG. 17, the memory 60 shown in FIG. 12 is replaced by a memory 70 which serves to store a resonance frequency of the head drum structure 4. Further, the tape detector 64 employed in the embodiment shown in FIG. 12 is spared in the apparatus shown in FIG. 17. Further, the piezoelectric ceramic member 30 shown in FIG. 5A is used as the piezoelectric ceramic for the head drum structure 4. In the case of the piezoelectric ceramic member shown in FIG. 3A, only one set of plural metal electrode sets is used as an acceleration detector. An acceleration detector 58 for detecting the acceleration from the vibration of the piezoelectric ceramic member 30 is provided in combination with an amplifier 72 which serves to amplify the output signal of the acceleration detector 58. The output of the amplifier 72 is supplied to the arithmetic unit 52. The resonance frequency is determined in a manner described below.

Upon striking the head drum at a surface thereof with a hammer or the like, a vibration takes place. This vibration is referred to as the surface elastic wave and propagates on and along the drum surface. On the other hand, when the piezoelectric ceramic cylinder undergone the specific polarization treatment and bonded to the inner peripheral surface of the head drum is caused to expand and contract, as described hereinbefore, a bending vibration take places in the drum, whereby the drum on the whole is caused to deform. The resonance point, the wavelength and the vibration mode of the surface elastic wave are definitely determined by the physical properties (such as density, Young's modulus and Poisson's ratio) of the elastic material through which vibration propagates and a structure of the elastic material ($V = f \cdot \lambda$). On the other hand, in the case of the bending vibration, the wavelength of the corresponding vibration wave is determined in dependence on the length of the electrode undergone the polarization treatment. More specifically, in the electrode pattern mentioned hereinbefore, two adjacent electrodes corresponds to a unity wavelength. The resonance frequency is determined as follows.

The bending vibration of the drum is handled as a bending vibration of a beam, for which a differential equation is derived. First, the bending vibration only of the drum is considered. The X-axis is taken along the center axis of a beam. A deflection of the beam in the transverse direction is represented by $\omega(x, t)$, Young's modulus of material by E, mass per unit area by $\rho$, cross-sectional area of the beam by A, and the sectional second-order moment is represented by I. Then, from a bending moment and a shearing force, the following differential equation holds valid:

$$\frac{\partial^2 \omega(x, t)}{\partial t^2} + \frac{EI}{\rho A} \frac{\partial^4 \omega(x, t)}{\partial x^4} = 0 \quad (1)$$

For the stationary or standing vibration, the equation mentioned below applies valid:

$$\omega(x, t) = Y(x)(A \sin \omega t + B \cos \omega t) \quad (2)$$

Then, when the equation (2) is substituted into the equation (1), an equation (3) is obtained and a function $Y(x)$ can be determined from the following equation (3):

$$\frac{d^4 Y}{dx^4} - \frac{\omega^2}{a^2} Y = 0 \quad (3)$$

When $\lambda^4 = \omega^2 \iota^4 / a^2$, $(a^2 = EI/\rho A)$ $$Y(x) = C1 \sin \frac{\lambda x}{\iota} + C2 \cos \frac{\lambda x}{\iota} + \quad (4)$$

$$C3 \sinh \frac{\lambda x}{\iota} + C4 \cosh \frac{\lambda x}{\iota}$$

Solving the above equation for a simple support end, the inherent vibration frequency is determined as:

$$\omega_i = \frac{i^2 \pi^2}{\iota^2} \sqrt{\frac{EI}{\rho A}} \quad (\iota = \lambda/2) \quad (5)$$

Figure 18A:
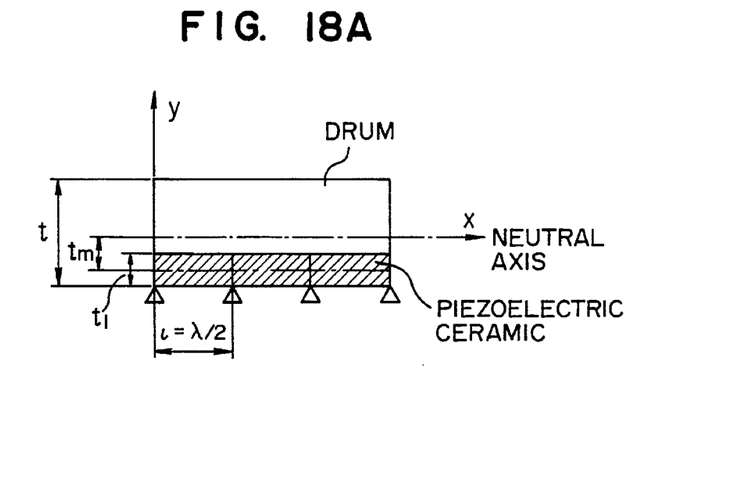
FIG. 18A is a schematic diagram for illustrating a method of determining a resonance frequency in a head drum apparatus according to the invention.
Figure 18B:
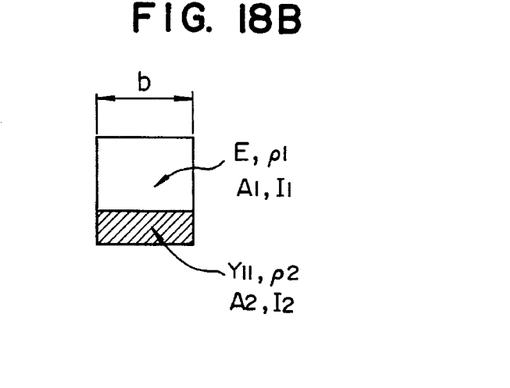
FIG. 18B is a schematic diagram for illustrating the resonance frequency determination in combination with FIG. 18A.

On the other hand, when piezoelectric ceramic member is bonded to an elastic material in such manner as shown in FIGS. 18A and 18B and electrically excited, then $$K_c = EI_1 + Y_{11}I_2 - bk_{31}^2 Y_{11} \times t_1 t_m / 2 \quad K_{31}^2 = e_{31}^2 / Y_{11} \in_{33} \quad (6)$$

where $t_1$, b and L represent a thickness of, width and length the elastic material, respectively, $I_1$ represents a sectional second-order moment of the elastic material, $I_2$ represents a sectional second-order moment of the piezoelectric ceramic, $Y_{11}$ represents Young's modulus of the piezoelectric material, $t_m$ represents a means distance of the piezoelectric ceramic from a neutral axis, $e_{31}$ represents a piezoelectric stress constant, $\in_{33}$ represents a dielectric constant, and $k_{31}$ represents an electromechanical coupling constant.

Accordingly, $$\omega_i = \frac{i^2 \pi^2}{\iota^2} \sqrt{\frac{K_c}{\rho A}} \quad (7)$$

Figure 19:
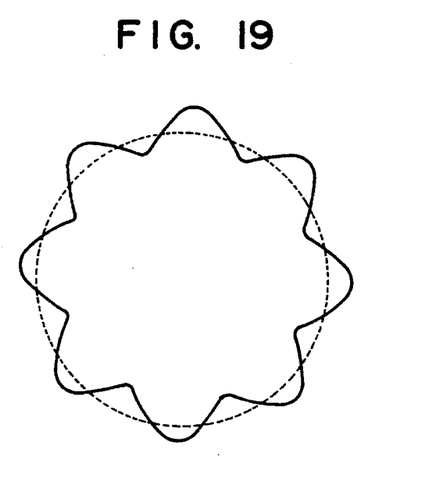
FIG. 19 is a diagram illustrating a bending vibration generated in a head drum apparatus according to the invention.

By placing numerical values in the above expression (7), the inherent resonance vibration frequency can be determined. When the drum is constituted by a ring which is not secured, as shown in FIG. 19, there can be observed on the drum a vibration having apexes and valleys distributed uniformly in a toothed-wheel-like pattern. When the number of polarized portions is, for example, sixteen, there make appearance eight apexes and eight valleys (i.e., sixteen peaks), as shown in FIG. 19. In this case, the resonance frequency of 45 KHz can be determined from the expression (7).

Thus, data values indicative of 45 KHz is stored in the memory 70. The arithmetic unit 52 responds to reception of the dew detection signal supplied from the dew detector to start the vibration control. More specifically, the arithmetic unit 52 references the memory 70 to read out data indicative of the resonance frequency and a predetermined frequency range to thereby generates a frequency control signal for changing the oscillation frequency within the predetermined frequency range around the resonance frequency. The frequency control signal is then applied to the variable-frequency oscillator 54. The amplifier 56 serves to output a predetermined amplitude control signal. The oscillator 54 generates a high-frequency voltage signal having a frequency determined on the basis of the frequency control signal. The output voltage signal of the oscillator 54 is supplied to the amplifier 56 while the frequency of this signal is fed back to the arithmetic unit 52. The amplifier 56 amplifies the high-frequency voltage signal in response to the amplitude control signal. The amplified high-frequency voltage signal is then applied to the piezoelectric ceramic member 30 to bring about vibration of the piezoelectric ceramic member 30, whereby sticking of the tape to the drum structure is prevented. The acceleration detector 58 detects acceleration of the vibration from a voltage produced between electrodes 48 and 50 of the piezoelectric ceramic member 30. The electromotive force due to the reverse piezoelectric effect taking place between the electrodes 48 and 50 of the piezoelectric ceramic member 30 represents an acceleration component of the piezoelectric ceramic bonded to the drum. According, the electrodes 48 and 50 can be used as an acceleration detector. The acceleration signal as detected is inputted to the arithmetic unit 52 after having been amplified by the amplifier 72. The arithmetic unit 52 holds the frequency corresponding to the maximum acceleration as detected and supplies the frequency control signal to the oscillator 54 so that it oscillates at the frequency corresponding to the maximum frequency. In this manner, the piezoelectric ceramic member 30 can vibrate at a maximum efficiency even when the vibration frequency is shifted from the resonance frequency because of thermal characteristic of the ceramic member. Adjustment of the vibration amplitude and hence the tension of the tape can be realized in the same manner as in the case of the vibration control circuit shown in FIG. 12.

As is apparent from the above description, according to the method of automatically tracking or following the resonance frequency, the frequency is constantly swept in positive (plus) and negative (minus) directions around the expected resonance frequency. The value of the center frequency is changed in the direction in which the electromotive force increases so that the sweeping around the resonance point is constantly maintained.

In the foregoing description, it has been assumed that the piezoelectric ceramic is bonded to the inner peripheral surface of the head drum by using an adhesive or a bonding agent. However, the invention is never restricted to such mounting method. The piezoelectric ceramic layer may be secured by using screws or threaded bolts.

As can now be understood form the foregoing, according to the invention which teaches that the piezoelectric ceramic member is secured to the inner peripheral surface of the stationary head drum and a small vibration is generated by the piezoelectric ceramic member by applying a high-frequency voltage thereto, the tape wound around the stationary head drum is caused to float from the drum, so to say, whereby friction between the tape and the drum can be reduced significantly. Since the small vibration can be generated with a simple structure, the frequency as well as the amplitude of the vibration can be set at desired values. By taking advantage of these features effectively, it is possible to reduce the friction between the tape and the head drum regardless of the type and the thickness of tape and the surface roughness of the head drum. Further, according to the invention, it is possible to follow automatically the resonance frequency by utilizing a portion of the piezoelectric ceramic layer as an acceleration sensor. Moreover, the tension applied to the tape can be controlled by making variable the vibration frequency as well as vibration amplitude without need for modification or change of the tape transportation mechanism.

What is claimed is:

1. A head drum apparatus, comprising:

a cylindrical stationary head drum having an inner peripheral surface and an outer peripheral surface around a portion of which a magnetic tape is wound; and a piezoelectric ceramic member coupled to said inner peripheral surface of said head drum and including a cylindrical piezoelectric ceramic material which has an inner peripheral surface and an outer peripheral surface, first electrode means formed on said inner peripheral surface of said piezoelectric ceramic material, and second electrode means formed on said outer peripheral surface of said piezoelectric ceramic material;

wherein said piezoelectric ceramic material includes at least two portions each of which is polarized by applying DC voltage between said first electrode means and said second electrode means such that adjacent ones of said portions have polarities opposite to each other, and said first electrode and said second electrode provides flexural vibration in response to AC voltage applied between said first electrode means and said second electrode means to cause said outer peripheral surface of said head drum to vibrate.

2. A head drum apparatus according to claim 1, further comprising:

a second piezoelectric ceramic member coupled to an inner peripheral surface of said piezoelectric ceramic member and including a second cylindrical piezoelectric ceramic material which has a second inner peripheral surface and a second outer peripheral surface, third electrode means formed on said second inner peripheral surface of said second piezoelectric ceramic material, and fourth electrode means formed on said second outer peripheral surface of said second piezoelectric ceramic material;

wherein said second piezoelectric ceramic material is divided into at least two second portions each of which is polarized by applying second DC voltage between said third electrode means and said fourth electrode means such that adjacent ones of said second portions have polarities opposite to each other, and said third electrode means and said fourth electrode means provides flexural vibration in response to second AC voltage applied between said third electrode means and said fourth electrode means to cause said outer peripheral surface of said head drum to vibrate.

3. A head drum apparatus according to claim 1, wherein said outer peripheral surface of said head drum is formed with a plurality of small notches.

4. A head drum apparatus according to claim 1, wherein said head drum includes a stationary portion, a cylindrical vibratory portion to which said piezoelectric ceramic member is coupled such that said cylindrical vibratory portion is caused to vibrate in response to vibration of said piezoelectric ceramic member, and a cylindrical thin wall portion provided between said stationary portion and said cylindrical vibratory portion.

5. A head drum apparatus according to claim 1, wherein said piezoelectric ceramic member further includes a pair of particular electrodes one of which is formed on said inner peripheral surface of said piezoelectric ceramic material and the other of which is formed on said outer peripheral surface of said piezoelectric ceramic material; and said head drum apparatus further comprises driving means for outputting said AC voltage, acceleration detecting means for detecting acceleration from a voltage appearing across said pair of particular electrodes, and control means for controlling a frequency of said AC voltage, which is outputted from said driving means, in accordance with the acceleration detected by said acceleration detecting means.

6. A head drum apparatus according to claim 5, further comprising dew detecting means for detecting dew on said outer peripheral surface of said head drum to generate a vibration start signal, and;

wherein said driving means outputs said AC voltage after receiving said vibration start signal from said dew detecting means.

7. A head drum apparatus according to claim 5, further comprising:

tape data storing means for storing tape data indicative of amplitudes and frequencies of said AC voltage in dependence on types of magnetic tapes, respectively;

detecting means for detecting a type of a magnetic tape being used; and reading means for reading out the tape data in dependence on the detected type to generate an amplitude signal and a frequency signal in accordance with the read out tape data;

wherein said driving means outputs said AC voltage having an amplitude and a frequency which are indicated by said amplitude signal and said frequency signal, respectively.

8. A head drum apparatus according to claim 7, wherein said detecting means detects the type of the tape being used based on information presented by a case in which the tape being used is accommodated.

9. A head drum apparatus according to claim 7, wherein said detecting means detects the type of the tape being used based on predetermined values indicative of the types of the tapes.

10. A head drum apparatus according to claim 5, further comprising: tension data storage means for storing tension data indicative of tension to be applied to magnetic tapes;

tension detecting means for detecting a tension applied to a tape being used;

means for generating an amplitude signal indicative of an amplitude determined based on the detected tension and stored tension data; and wherein said driving means outputs said AC voltage having an amplitude which is indicated by said amplitude signal.

11. A head drum apparatus according to claim 5;

wherein said driving means outputs said AC voltage while varying a frequency of said AC voltage within a predetermined frequency range including a resonance frequency of said stationary drum head in response to a detection start signal, said acceleration detecting means supplies said detection start signal to said driving means to detect a maximum acceleration over a period during which the frequency of said AC voltage is varied; and said driving means outputs said AC voltage having a frequency which is determined when said maximum acceleration is detected by said acceleration detecting means.

12. A head drum apparatus according to claim 1:

wherein said first electrode means includes a first plurality of electrodes; and said second electrode means includes a second plurality of electrodes each of which is formed so as to be opposite to a corresponding one of said first plurality of electrodes.

13. A head drum apparatus according to claim 12 wherein each of said second plurality of electrodes is formed so as to extend to said inner peripheral surface of said piezoelectric ceramic material.

14. A head drum apparatus according to claim 13 wherein said piezoelectric ceramic member further includes:

first connection means for electrically connecting said first plurality of electrodes after polarizing said piezoelectric ceramic material; and second connection means for electrically connecting said second plurality of electrodes after polarizing said piezoelectric ceramic material.

15. A head drum apparatus according to claim 12 wherein said piezoelectric ceramic member further includes:

first connection means for electrically connecting said first plurality of electrodes after polarizing said piezoelectric ceramic material; and second connection means for electrically connecting said second plurality of electrodes after polarizing said piezoelectric ceramic material.

16. A head drum apparatus according to claim 1 wherein one of said first electrode means and said second electrode means includes a common electrode; and the other of said first electrode means and said second electrode means includes a plurality of electrodes.

17. A head drum apparatus according to claim 16 wherein said piezoelectric ceramic member further includes connection means for electrically connecting the other of said first electrode means and said second electrode means after polarizing said piezoelectric ceramic material.

18. A head drum apparatus according to claim 1:

wherein one of said first electrode means and said second electrode means includes a common electrode and a first electrode; and the other of said first electrode means and said second electrode means includes a plurality of electrodes one of which is formed so as to be opposite to said first electrode.

19. A head drum apparatus according to claim 18 wherein said piezoelectric ceramic member further includes connection means for electrically connecting said plurality of electrodes after polarizing said piezoelectric ceramic material.

* * * * *